US008659772B2

(12) United States Patent
Nakagawa

(10) Patent No.: US 8,659,772 B2
(45) Date of Patent: Feb. 25, 2014

(54) PRINT PROCESSING APPARATUS AND METHOD OF CONTROLLING THE SAME, AND MANAGEMENT APPARATUS AND METHOD OF CONTROLLING THE SAME PROVIDE INFORMATION TO BE FED BACK IN SECOND OR SUBSEQUENT JOB DATA PRINTING USING INFORMATION OF THE OPERATION HISTORY

(75) Inventor: Isamu Nakagawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 12/581,881

(22) Filed: Oct. 20, 2009

(65) Prior Publication Data

US 2010/0118333 A1 May 13, 2010

(30) Foreign Application Priority Data

Nov. 7, 2008 (JP) ................................. 2008-287180

(51) Int. Cl.
G06F 3/12 (2006.01)
G06K 15/00 (2006.01)
H04N 1/00 (2006.01)
H04N 1/46 (2006.01)

(52) U.S. Cl.
USPC ........ 358/1.15; 358/1.13; 358/1.16; 358/403; 358/501

(58) Field of Classification Search
USPC .............. 358/1.15, 1.16, 1.13, 1.1, 1.14, 403, 358/501, 538, 401, 453; 707/10, 3, 600, 707/602, 661, 674, 679, 705, 706, 754, 707/768.769; 709/216, 201, 212
See application file for complete search history.

(56) References Cited

U.S. PATENT DOCUMENTS

| 7,177,034 B2 | 2/2007 | Nakagawa et al. | |
| 7,221,885 B2 * | 5/2007 | Sato | 399/81 |
| 2004/0190033 A1 * | 9/2004 | Ferlitsch | 358/1.13 |
| 2006/0050307 A1 * | 3/2006 | Koike | 358/1.15 |
| 2007/0201091 A1 * | 8/2007 | Tanaka | 358/1.16 |
| 2007/0273915 A1 | 11/2007 | Nakagawa | |
| 2008/0288507 A1 | 11/2008 | Nakagawa | |
| 2009/0122346 A1 * | 5/2009 | Kamata | 358/1.16 |

FOREIGN PATENT DOCUMENTS

| JP | 2002-185658 A | 6/2002 |
| JP | 2005-119095 A | 5/2005 |

* cited by examiner

Primary Examiner — Ngon Nguyen
(74) Attorney, Agent, or Firm — Fitzpatrick, Cella, Harper & Scinto

(57) ABSTRACT

After operation histories are appropriately selected and merged, the merged operation history is converted into a job definition file (A) and transmitted to upstream. When resending the job, the designation of the job definition file (A) is added to the original job definition file and transmitted.

6 Claims, 17 Drawing Sheets

FIG. 6

| OPERA-TION ID | DATE/TIME | PROCESS | PARAMETERS |
|---|---|---|---|
| 122 | 2008/09/16 10:01:10 | LOGIN | USER ID : 1000 |
| 123 | 2008/09/16 10:02:20 | JOB SELECTION | JOB ID : 500 |
| 124 | 2008/09/16 10:03:18 | COLOR ADJUSTMENT | Y : 2 |
| 125 | 2008/09/16 10:04:22 | TEST-PRINT | |
| 126 | 2008/09/16 10:06:40 | COLOR ADJUSTMENT | Y : 3, M : −1 |
| 127 | 2008/09/16 10:06:59 | TEST-PRINT | |
| 128 | 2008/09/16 10:10:01 | COLOR ADJUSTMENT | Y : 4, M : −2 |
| 129 | 2008/09/16 10:12:34 | TEST-PRINT | |
| 130 | 2008/09/16 10:13:33 | COLOR ADJUSTMENT | Y : 3, M : −2 |
| 131 | 2008/09/16 10:14:04 | TEST-PRINT | |
| 132 | 2008/09/16 10:14:59 | LOGOUT | |
| ... | ... | ... | ... |
| 223 | 2008/09/16 11:23:33 | LOGIN | USER ID : 1100 |
| 224 | 2008/09/16 11:24:45 | JOB SELECTION | JOB ID : 500 |
| 225 | 2008/09/16 11:25:13 | TEST-PRINT | |
| 226 | 2008/09/16 11:25:45 | PRINTING POSITION ADJUSTMENT | X : +1, Y : +3 |
| 227 | 2008/09/16 11:27:45 | TEST-PRINT | |
| 228 | 2008/09/16 11:29:32 | PRINTING POSITION ADJUSTMENT | X : +3, Y : +3 |
| 229 | 2008/09/16 11:30:33 | TEST-PRINT | |
| 330 | 2008/09/16 11:31:22 | PRINT | |
| 331 | 2008/09/16 11:33:11 | LOGOUT | |
| ... | ... | ... | ... |
| 555 | 2008/09/16 13:11:33 | LOGIN | USER ID : 1200 |
| 556 | 2008/09/16 13:11:45 | GRADATION CHANGE | SMOOTH 1 |
| 557 | 2008/09/16 13:12:33 | TEST-PRINT | |
| 558 | 2008/09/16 13:12:43 | GRADATION CHANGE | SMOOTH 2 |
| 559 | 2008/09/16 13:14:33 | TEST-PRINT | |
| 560 | 2008/09/16 13:15:13 | LOGOUT | |
| ... | ... | ... | ... |
| 1600 | 2008/09/16 13:15:11 | LOGIN | USER ID : 2000 |
| 1601 | 2008/09/16 13:17:34 | JOB SELECTION | JOB ID : 500 |
| 1602 | 2008/09/16 13:18:00 | DELETION | JOB ID : 500 |
| 1603 | 2008/09/16 13:18:12 | LOGOUT | |

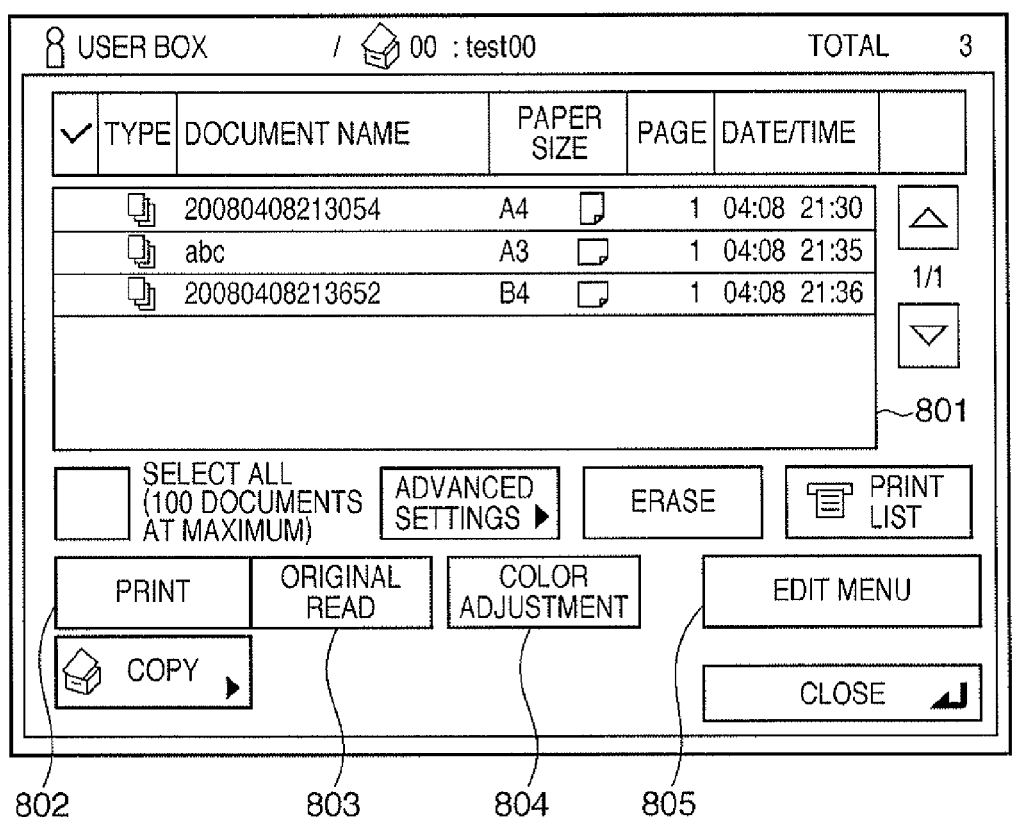

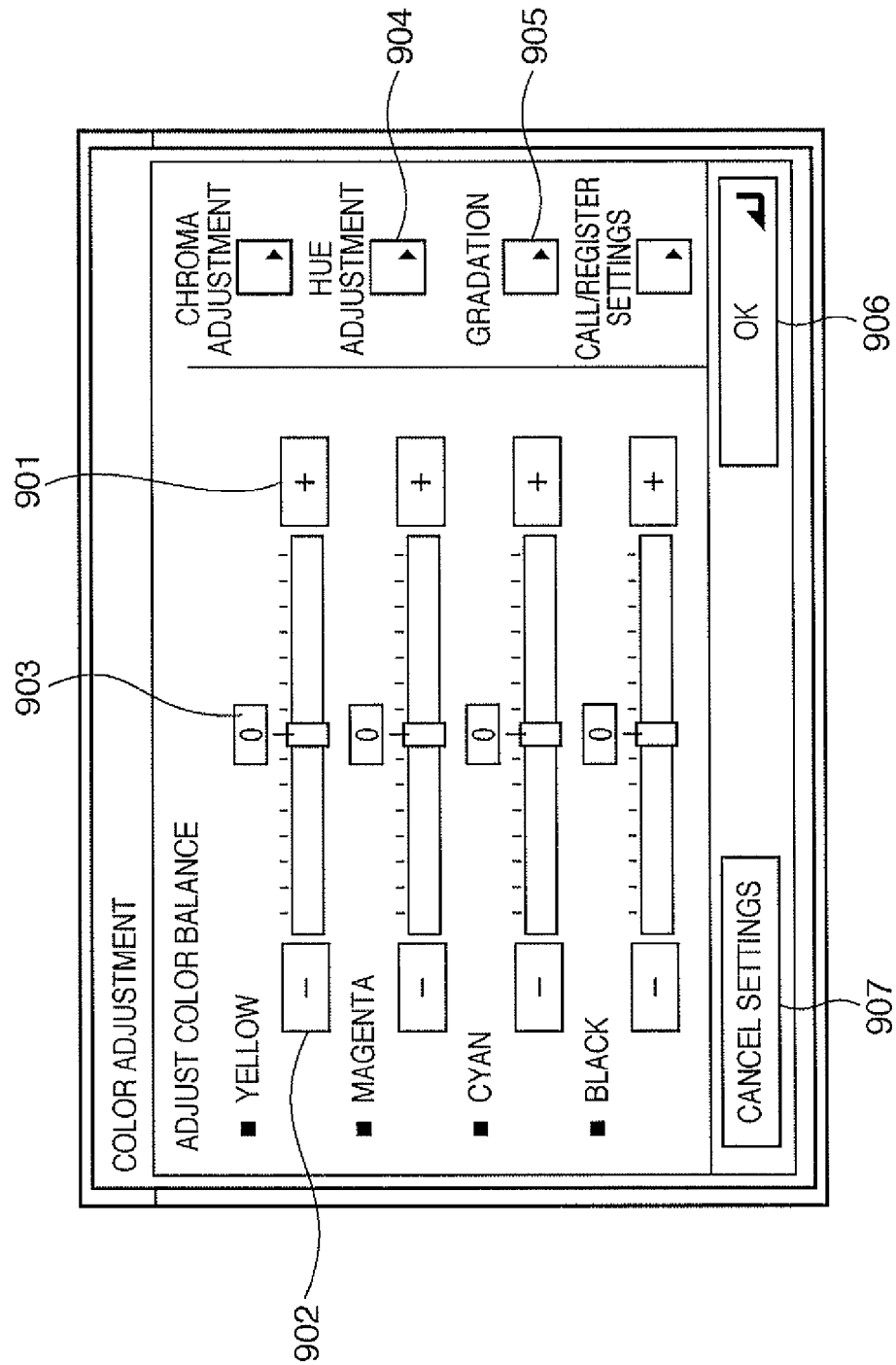

F I G. 12

| ITEM | EXAMPLE |
|---|---|
| OPERATION ID | 125 |
| JOB HISTORY RECORDING NUMBER | 13 |
| JOB TYPE | PRINT |
| JOB ID | 500 |
| STATUS | NORMAL END |
| START TIME | 2008/09/16 10:04:22 |
| END TIME | 2008/09/16 10:06:32 |
| USER ID | 1000 |
| DOCUMENT NAME | abc |
| NUMBER OF LOGIC SURFACES | 12 |
| PAPER SIZE | A4 |
| NUMBER OF DISCHARGED SHEETS | 12 |
| NUMBER OF PRINTED SURFACES | 12 |
| PAGE LAYOUT | 1 |
| COLOR MODE | COLOR |
| PRINTED SURFACE | SINGLE-SIDED |

| LIST OF PROCESSES NOT TO BE FED BACK |
|---|
| HUE ADJUSTMENT PROCESSING |
| SADDLE STITCH SETTING |

| LIST OF AGGREGATABLE PROCESSES |
|---|
| COLOR BALANCE |

```
<ColorCorrectionOp SourceObjects="All"
    TonerYellow="+3"
    TonerMagenta="-2"/>
```

FIG. 20

| PART | CHANGE DATE |
|---|---|
| TONER: CYAN | 2008/09/11 |
| FIXING DEVICE | 2008/08/11 |
| ... | ... |

FIG. 21

| CHANGE PART | PROCESS TO BE DEFEASED |
|---|---|
| TONER CHANGE : YELLOW | COLOR ADJUSTMENT : YELLOW |
| TONER CHANGE : CYAN | COLOR ADJUSTMENT : CYAN |
| TONER CHANGE : MAGENTA | COLOR ADJUSTMENT : MAGENTA |
| TONER CHANGE : BLACK | COLOR ADJUSTMENT : BLACK |
| ... | ... |

FIG. 22

| UPDATE PROCESS | PROCESS TO BE DEFEASED |
|---|---|
| PAPER SIZE CHANGE | PRINTING POSITION ADJUSTMENT |
| ... | ... |

| COUNTER TYPE | COUNTER VALUE |
|---|---|
| TOTAL | 85686 |
| MONOCHROME TOTAL | 38565 |
| COLOR TOTAL | 47121 |

PRINT PROCESSING APPARATUS AND METHOD OF CONTROLLING THE SAME, AND MANAGEMENT APPARATUS AND METHOD OF CONTROLLING THE SAME PROVIDE INFORMATION TO BE FED BACK IN SECOND OR SUBSEQUENT JOB DATA PRINTING USING INFORMATION OF THE OPERATION HISTORY

BACKGROUND OF THE INVENTION

1. Field of the Invention

The present invention relates to a print processing apparatus and a method of controlling the same, and a management apparatus and a method of controlling the same.

2. Description of the Related Art

Recently, a print-on-demand (to be referred to as POD hereinafter) market is spreading, in which an image forming apparatus of electrophotographic or inkjet scheme outputs a printed product based on a printed product creation request received from a customer, and the customer pays for it. The POD market aims at delivering a job of a relatively small lot in a short time. The POD market therefore requires a relatively small-scale environment and a method of coping with it in place of a conventional large-scale printing machine and printing method such as a large-scale printing apparatus or system.

In the printing method of POD, an image forming apparatus has a print queue so as to retain print data. A print operator changes the parameter of data on a print queue, performs test-print, and confirms whether a desired printed product has been obtained. If a problem exists, the operator can adjust the parameters to solve it and repeatedly perform the parameter adjustment and test-print until a desired printed product is obtained.

For example, Japanese Patent Laid-Open No. 2005-153346 discloses a technique using an operation history in setup processing on an image forming apparatus so as to decrease the labor of a user who performs a scan operation and a copy operation on the image forming apparatus.

SUMMARY OF THE INVENTION

In the above-described POD market or the like, identical or slightly changed print data is printed on occasion after a period of time (after several months) because a small number of copies can be printed. In this case, if the operator of the second or subsequent printing is different from that of the first printing, the printing result may change although similar print data is used. Additionally, the labor and time of the operation increase due to repeated parameter adjustment and test-print regardless of whether the operator is the same or different.

The second and subsequent printing may be done using an operation history, as in Japanese Patent Laid-Open No. 2005-153346 described above. However, it is difficult for another operator to determine which one of the operation histories of repeatedly executed parameter adjustment and test-print should be applied.

The first printing and the second or subsequent printing may be performed under different circumstances of a printing apparatus or the like. They need to be taken into consideration when using an operation history.

The present invention provides information to be fed back in second or subsequent job data printing using at least part of the information of the operation history of an operation by, for example, an operator on a print processing apparatus.

According to one aspect of the present invention, there is provided a print processing apparatus connected to a management apparatus for managing job data, comprising: a retention unit which retains print data corresponding to the job data received from the management apparatus; an operation reception unit which receives a print setting change operation by a user for the print data retained by the retention unit; an operation history storage unit which stores an operation history of change operations received by the operation reception unit; a generation unit which generates, based on at least some of print setting items included in the operation history stored in the operation history storage unit, feedback data to be fed back to print settings of the job data; a transmission unit which transmits, to the management apparatus, the feedback data generated by the generation unit; and a print unit which prints the print data retained by the retention unit.

According to the present invention, it is possible to provide information to be fed back in second or subsequent job data printing using at least part of the information of the operation history of an operation by, for example, an operator on a print processing apparatus.

This decreases the number of man-hour of a user and largely shortens the time from job input to completion of printing. In addition, since the print operator need not learn the operation of selecting print settings, the operation efficiency improves, and human errors can be eliminated.

Further features of the present invention will become apparent from the following description of exemplary embodiments with reference to the attached drawings.

BRIEF DESCRIPTION OF THE DRAWINGS

FIG. 6 is a view showing an example of an operation history;

FIG. 7 is a schematic view showing an example of login display;

FIG. 8 is a schematic view showing an example of a job selection window;

FIG. 9 is a schematic view showing an example of a color adjustment window;

FIG. 12 is a view showing an example of a job history (print);

FIG. 20 is a view showing an example of a part change history;

FIG. 21 is a view showing an example of a change part collation table representing the correspondence between change parts and processes to be defeased;

FIG. 22 is a view showing an example of a table representing the correspondence between job update and processes to be defeased;

DESCRIPTION OF THE EMBODIMENTS

[First Embodiment of Present Invention]

The best mode for carrying out the present invention will now be described with reference to the accompanying drawings.

<Hardware Configuration of MFP According to Embodiment of Present Invention>

Figure 1:
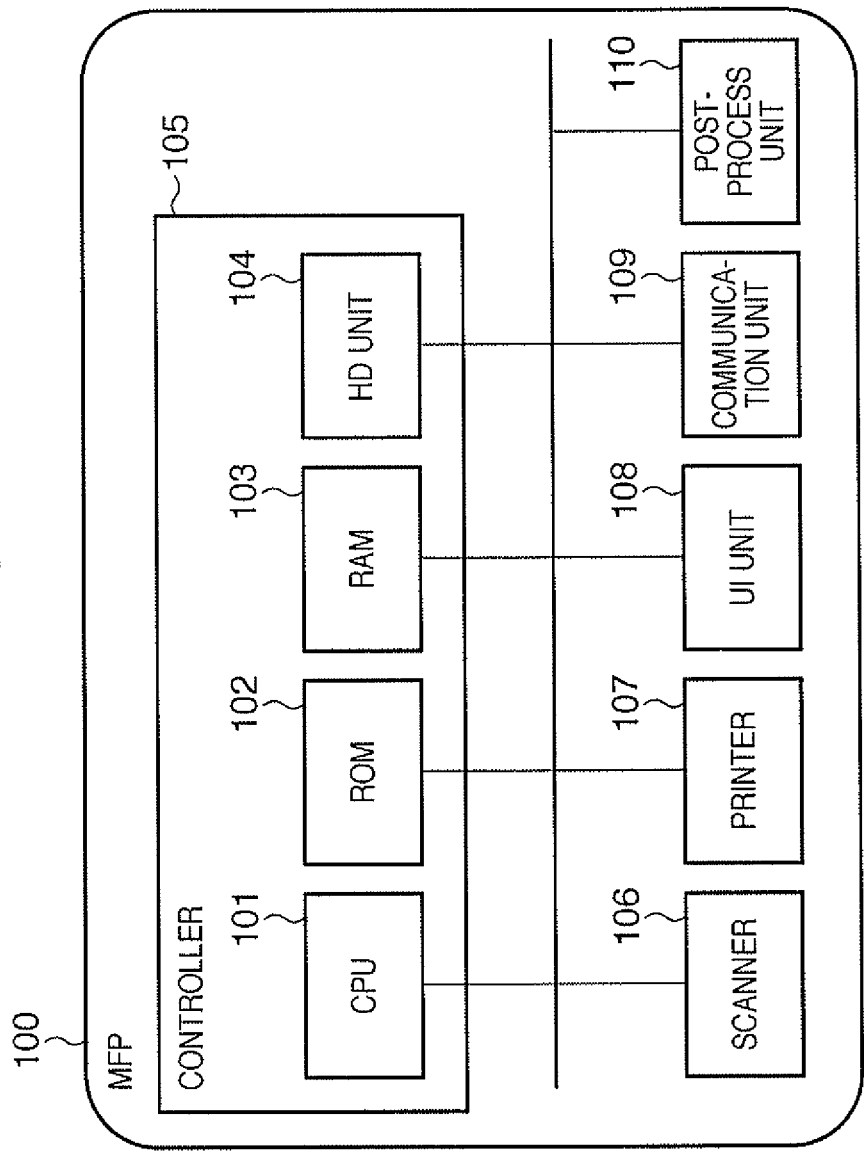
FIG. 1 is a block diagram showing an example of the arrangement of an MFP.

FIG. 1 is a block diagram showing an example of a multi function peripheral (to be referred to as an MFP hereinafter) to which the present invention is applicable. The MFP is a device having a plurality of functions such as copy, print, and scan functions. In this embodiment, the print function is essential. However, since the copy and scan functions are not essential, a single-function printer is usable. For this reason, the device such as an MFP used in this embodiment will sometimes be referred to as a print processing apparatus.

Referring to FIG. 1, a CPU (Central Processing Unit) 101 controls a controller and performs arithmetic processing and the like. A ROM (Read Only Memory) 102 is a storage area for, for example, the information of a system activation program. A RAM (Random Access Memory) 103 is a data storage area without use limits. An HD unit 104 is a nonvolatile storage device such as a hard disk or an SRAM. The RAM 103 is an area to load and execute the operating system (to be referred to as an OS hereinafter) and programs for communication control or engine control and store data.

A controller unit 105 includes the units 101 to 104 and controls the whole device. A scanner 106 reads an image. A printer 107 performs print processing under the control of the controller unit 105. There are several print processing schemes such as inkjet and electrophotographic schemes. In the electrophotographic scheme, toners that are fine particles bearing electrical charges are transferred onto a paper sheet by static electricity, and a fixing device fixes them, thereby printing. In many cases, the toners have four colors, that is, yellow, magenta, cyan, and black.

A UI (User Interface) unit 108 receives user instructions and performs display. A communication unit 109 is a unit for network communication control and enables communication with another device or computer. A system bus serves as a data path between the above-described constituent elements. A post-process unit 110 performs processes such as saddle stitch, cutting, punching, and case binding which are necessary after printing.

<Software Configuration of MFP According to Embodiment of Present Invention>

Figure 2:
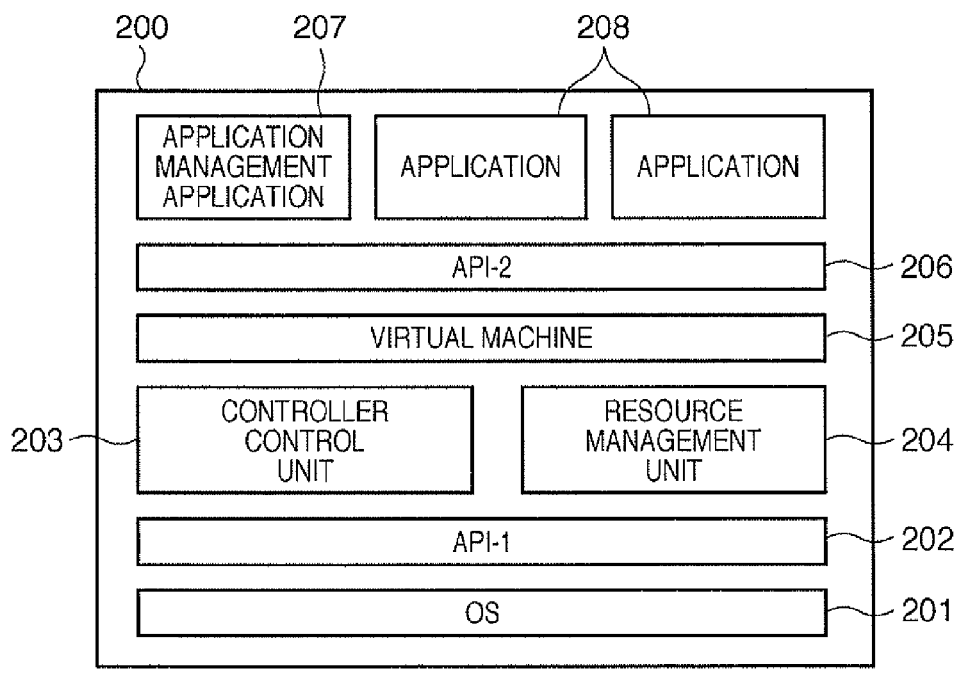
FIG. 2 is a block diagram showing an example of software in the MFP.

FIG. 2 is a block diagram showing an example of the software configuration of the MFP applicable in the present invention. The software is retained in the ROM 102 or the HD unit 104, loaded in the RAM 103 at the time of activation of the MFP, and then executed. Software 200 represents the whole software of the MFP applicable in the present invention.

An OS 201 manages and controls the resource of the entire MFP. An API-1 202 is an interface for an application which operates on the OS 201. The application can access the resource on the MFP or execute a command via the API-1. A controller control unit 203 operates on the OS 201 and controls the scanner 106, the printer 107, the UI unit 108, and the like.

A resource management unit 204 performs management to prevent the controller control unit 203, a virtual machine 205 to be described later, and all applications on the virtual machine 205 from using a predetermined amount of more of the resource of the MFP such as a memory. The virtual machine 205 is an execution environment optimized to execute a specific application. An example is a virtual machine for Java®.

An API-2 206 is an interface for an application operating on the virtual machine 205 to use the controller control unit 203, the resource management unit 204, the API-1 202, and the like. An application management application 207 manages applications operating on the virtual machine 205. The application management application 207 downloads, uploads, erases, and validates/defeases applications. Applications 208 run on the virtual machine 205.

It is possible to install and operate an arbitrary number of applications having arbitrary functions in an MFP 100 in accordance with their expected roles.

<Example of User Interface According to Embodiment of Present Invention>

Figure 3:
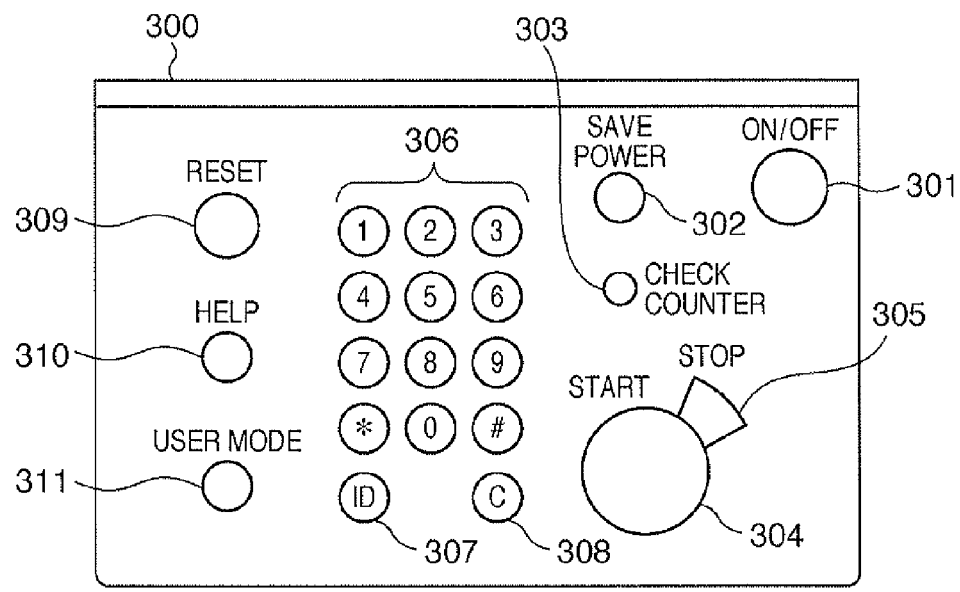
FIG. 3 is a schematic view showing an example of operation keys.
Figure 4:
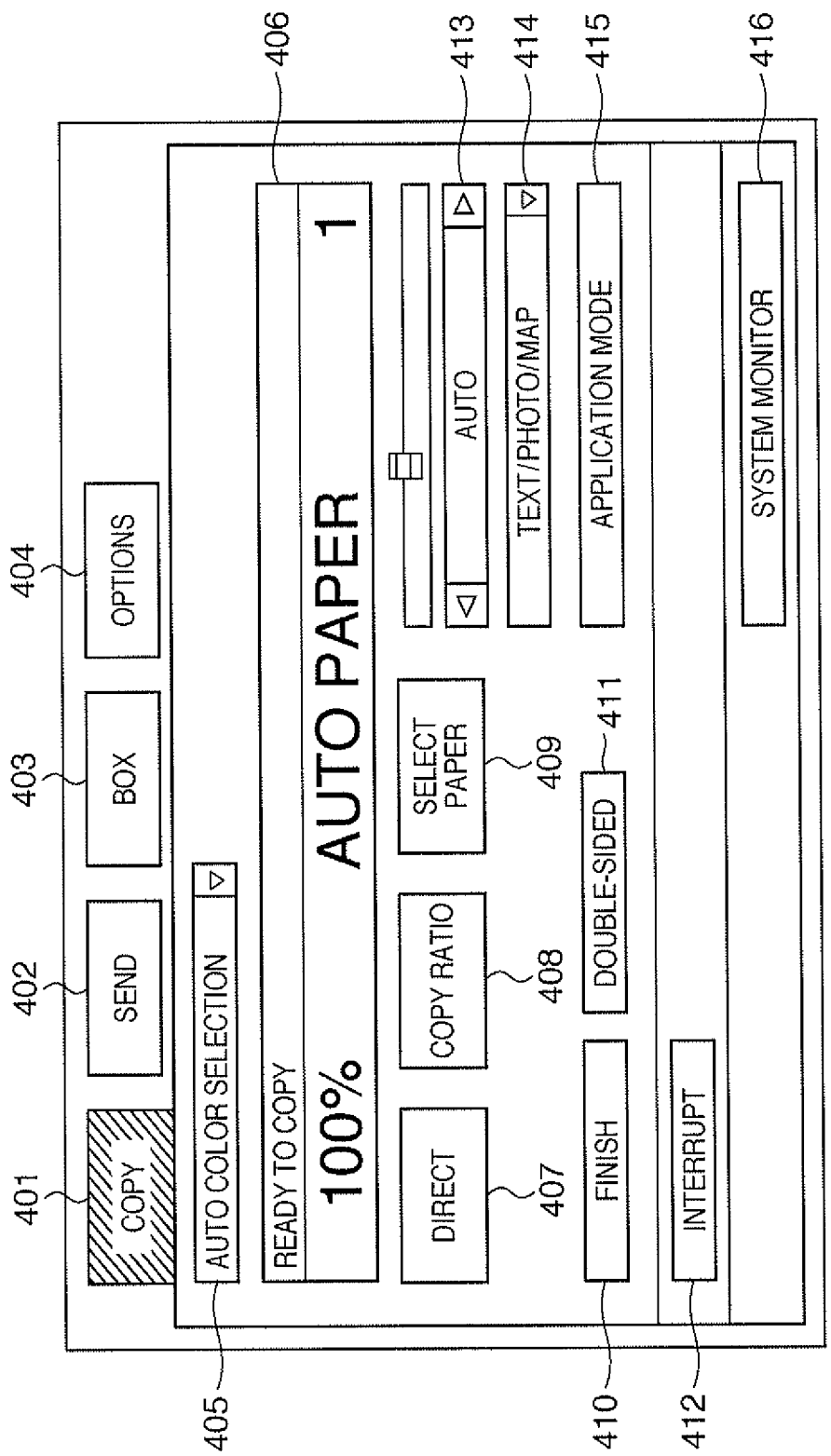
FIG. 4 is a schematic view showing an example of initial window display.

FIGS. 3 and 4 show examples of a UI provided by the UI unit 108. A key input unit 300 can accept a user operation via hard keys. An on/off button 301 is used to activate or stop the MFP. When the user presses a power save key 302, the MFP transits to a power saving mode. The power saving mode indicates a state in which the power consumption of the entire device is suppressed by stopping power supply to some parts in the device. When the user presses a counter check key 303, the value of the accounting counter is displayed on the touch panel. The touch panel will be explained later with reference to FIG. 4.

Figures 23, 24:
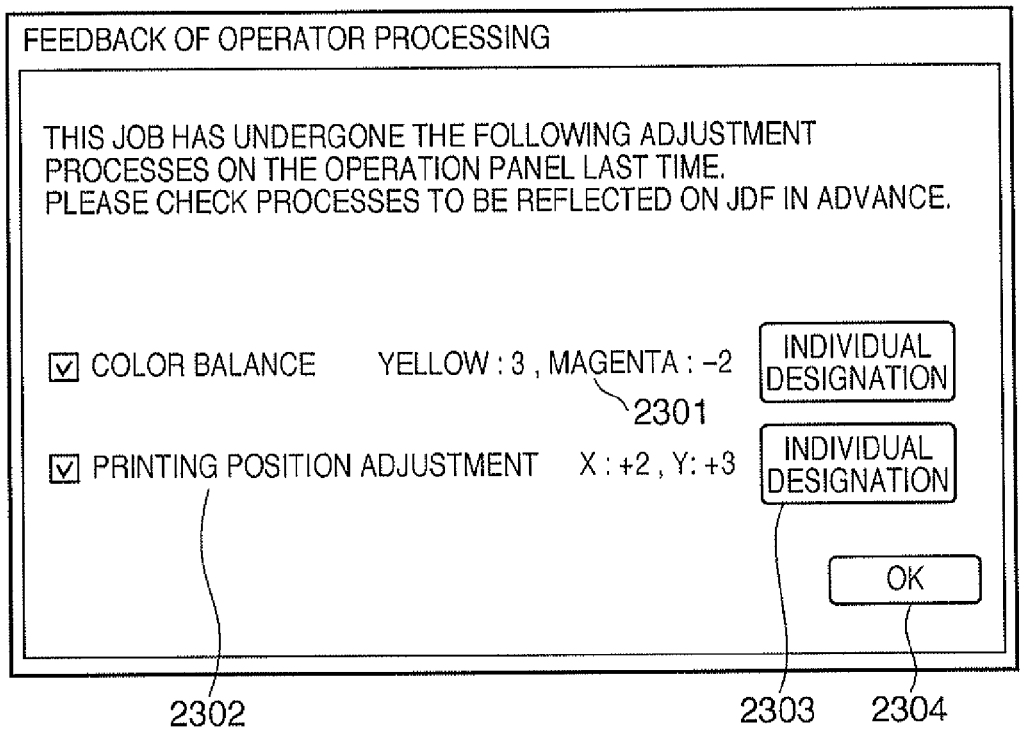
FIG. 23 is a view showing an example of a dialogue window displayed in job transmission.
FIG. 24 is a view showing a display example of an accounting counter.

FIG. 24 shows a display example of the accounting counter on the touch panel. "Total" represents the number of pages discharged from the MFP installation date to the current date. "Monochrome total" represents the number of pages of monochrome printing out of the total counter value. "Color total" represents the number of pages of printing except monochrome printing out of the total counter value.

When the user presses a start key 304, a job such as copy, print, scan, or send provided by the MFP starts. When the user presses a stop key 305, the job started by the start key 304 stops. A ten-key pad 306 is used to input numerical value information. An ID key 307 gives the instruction to input authentication information. A clear key 308 is used to clear the information input by the ten-key pad 306. A reset key 309 is used to reset all parameters designated by the user for a process target job.

When the user presses a help key 310, the information of, for example, an operation method is displayed to help user operation. A user mode key 311 is used to start various kinds of setup. The UI unit 108 includes a touch panel serving as an operation acceptance unit. The touch panel has a function of displaying, for example, job information and can receive user input by detecting whether the display region has been pressed.

Reference numeral 400 in FIG. 4 denotes an example of a window displayed on the touch panel when the MFP has become operable. The user presses a copy button 401 to do settings of copy processing. The user presses a send button 402 to do settings of send processing. The user presses a box button 403 to do settings of processing concerning a box. When the box button 403 is pressed, the window transits to that shown in FIG. 8 to be described later. The user presses an options key 404 to display the window of the application 208. In a color selection list box 405, the user changes the setting concerning colors by selecting "auto selection", "color", or "monochrome" from a list.

A status indicating field 406 displays notification information to the user such as a status or a message. For example, copy permission/prohibition, copy ratio, paper selection method, and the number of copies are displayed. The user designates direct copy by pressing a direct button 407. The user designates a copy ratio by pressing a copy ratio button 408. The user designates the paper feed source by pressing a paper selection button 409.

A finish button 410 is used to designate settings of, for example, sort execution on/off and finishing. A double-sided button 411 is used to designate one of a single-sided mode and a double-sided mode for original scan or printing. An interrupt button 412 is used to interrupt a job in progress to enable input of a new job.

A portion 413 includes a slide bar and buttons for density adjustment and designates the print concentration of a printed product. A list 414 is used to designate the characteristic of original scan so as to enable scan method switching between, for example, text scan and photo scan in accordance with the original of a printed product. An application mode button 415 enables complex instructions for, for example, image adjustment, settings of cover and inserting paper, designation of bookbinding, setting of OHP insertion, and binding margin size. When the user presses a system monitor button 416, the state of each component included in the MFP or job history information recorded in the MFP can be displayed.

As described above, the MFP can perform an operation of changing various kinds of print settings. A changed print setting item is associated with its set value and stored as an operation history.

<System Arrangement According to Embodiment of Present Invention>

Figure 5:
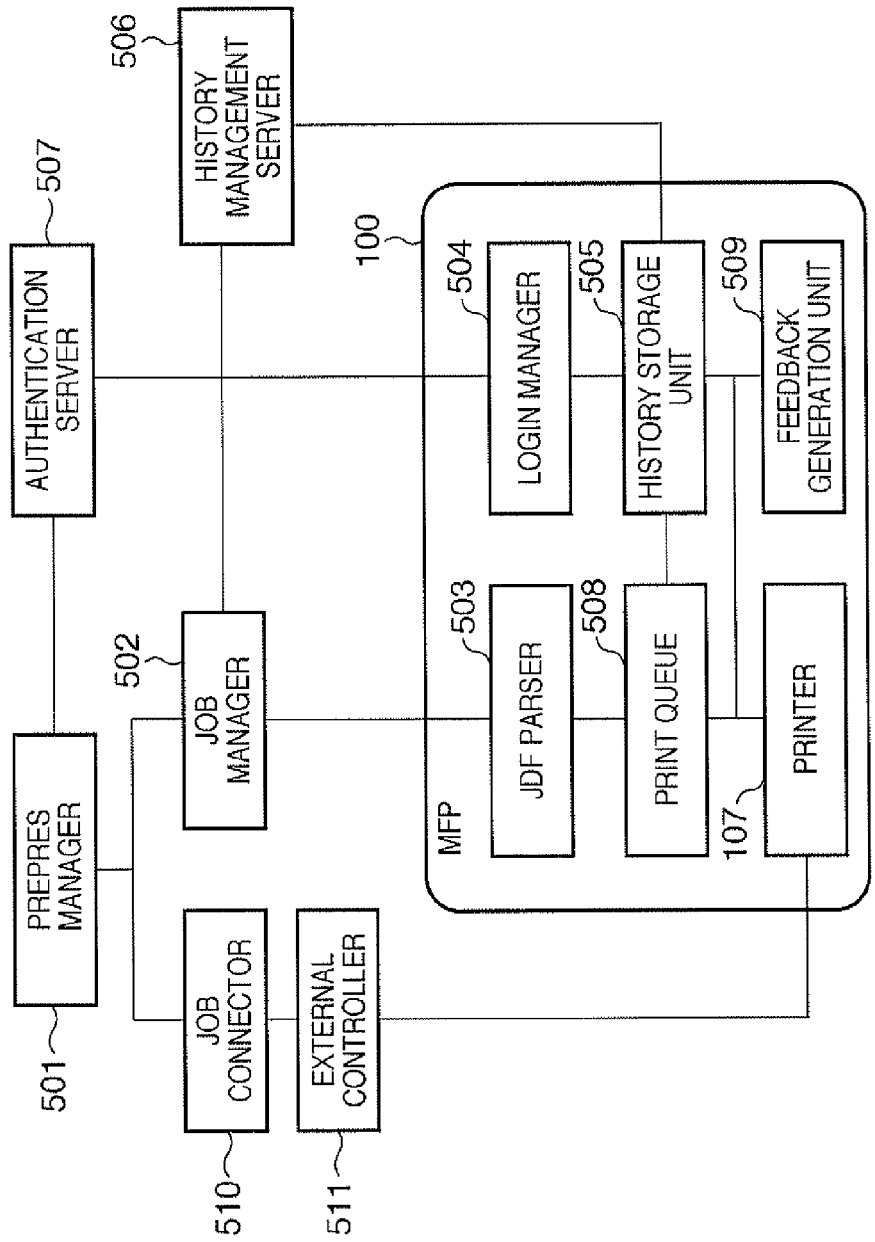
FIG. 5 is a schematic block diagram showing an example of the system arrangement of the present invention.

FIG. 5 is a schematic block diagram of the system. The system shown in FIG. 5 indicates the configuration of software modules implemented by a management apparatus such as a personal computer except the MFP. The management apparatus has a function of performing management concerning the MFP and print jobs.

A prepress manager 501 edits and creates print data that is a print target and also creates a job definition file. As the job definition file, a JDF® (Job Definition Format) file is used here. JDF is a protocol that enables job definition for a print workflow and mutual information communication between processes. An example of print data is PDF (Portable Document Format) of Adobe System Incorporated in U.S.A. JDF is defined by CIP4 (Cooperation for Integration of Processes in Prepress, Press, and Post press), and a detailed description thereof will be omitted here. JDF includes various kinds of setting information for print processing. In this viewpoint, JDF is sometimes called print setting data.

A job manager 502 transmits job data to the MFP 100 at an arbitrary timing in accordance with a user instruction. A normal example of job data is a set of PDF and JDF described above. A JDF parser 503 converts the job data received from the job manager 502 into a format optimum for execution by the MFP 100 and sends the converted data to a print queue 508. The print queue 508 is a queue to send jobs to the MFP 100. Each job retained on the print queue 508 can undergo various user operations such as editing and printing at an arbitrary timing. When printing is instructed, the print queue 508 transmits a job to the printer 107.

A login manager 504 performs login authentication when the user accesses the MFP 100 via the UI unit 108 or the communication unit 109. The login manager 504 can record and manage, in the HD unit 104, user information to be used for authentication or inquire of an authentication server 507 (to be described later) of the user information. A history storage unit 505 has an operation history storage function of retaining the history of operations performed by the user on the UI unit 108 or jobs executed by the printer 107. A history management server 506 periodically acquires the operation history or job history stored in the history storage unit 505, and retains and manages it. In this embodiment, the operation history is not an operation history stored in the MFP itself. Instead, a database is formed by receiving, from the MFP as setting definition data, an operation history associated with a print setting item selected from the operation history and accumulating it.

The authentication server 507 provides user information for login to the prepress manager 501, the job manager 502, and the login manager 504. This enables user identification. A feedback generation unit 509 transmits the operation history stored in the history storage unit 505 to the job manager 502. Detailed processing of the feedback generation unit 509 will be explained later with reference to FIG. 13. A job connector 510 converts JDF data into a format optimum for execution by the MFP 100 and sends it to the print queue 508. An external controller 511 is arranged outside the MFP 100 to control the printer 107 or transmit image data to the printer 107.

<Structure of Operation History According to Embodiment of Present Invention>

FIG. 6 shows an example of the operation history. The MFP according to the embodiment of the present invention includes the history storage unit 505 which stores and retains user operations. Information retained in the history storage unit 505 is stored in the HD unit 104.

The operation history records "operation ID", "date/time", "process, and "data (parameters) about the process". "Operation ID" is a character string to uniquely specify an operation, and is a natural number which continuously increases. "Date/time" is a time when an operation has been instructed. "Process" represents an overview of performed contents. "Parameter" is data about the process.

A detailed description will be made next using the operation history shown in FIG. 6. The record of operation ID: 122 represents that a user logged in by inputting "1000" in a user ID text box 701 on a login window 700 and, in a password text box 702, a correct password corresponding to the input user ID and pressing the ID key 307 at 10:01:10 on Sep. 16, 2008. The login window 700 will be described later with reference to FIG. 7. Operations from login to logout indicate a series of operations of the same user, although not expressly stated in FIG. 6. For example, operations from operation ID: 122 to operation ID: 132 are those performed by a user of user ID: 1000. The record of operation ID: 123 represents that the user selected a job of job ID: 500 on the job selection window. The job selection window will be explained later with reference to FIG. 8.

The record of operation ID: 124 represents that color adjustment to Y: 2 was performed on the color adjustment window. The color adjustment window will be described later with reference to FIG. 9.

The record of operation ID: 125 represents that test-print was performed. Test-print normally indicates printing one copy. However, setting may be done to print only specific pages of one copy. When printing has been executed, the MFP 100 records, in the HD unit 104, an execution history that is a result of job execution. The job execution history will be described later.

The record of operation ID: 126 represents that color adjustment to Y: 3 and M: −1 was performed on the color adjustment window.

The record of operation ID: 127 represents that test-print was performed.

The record of operation ID: 128 represents that color adjustment to Y: 4 and M: −2 was performed on the color adjustment window.

The record of operation ID: 129 represents that test-print was performed.

The record of operation ID: 130 represents that color adjustment to Y: 3 and M: −2 was performed on the color adjustment window.

The record of operation ID: 131 represents that test-print was performed.

The record of operation ID: 132 represents that the user logged out.

Operations from operation ID: 223 to operation ID: 331 are those performed by a user of user ID: 1100. Login, job selection, and test-print processing are the same those as described above.

The record of operation ID: 226 represents that printing position adjustment was performed. Printing position adjustment designates a position where printing should be performed in a paper sheet relative to a standard value. In this example, a position +1 mm in the X direction and +3 mm in the Y direction relative to the standard value was designated. The printing position adjustment window will be described later with reference to FIG. 10.

The record of operation ID: 228 represents printing position adjustment processing which is the same as that of operation ID: 226. In this example, a position +3 mm in the X direction and +3 mm in the Y direction was designated.

Operations from operation ID: 555 to operation ID: 560 are those performed by a user of user ID: 1200.

The record of operation ID: 556 represents that the gradation was changed to smooth 1. Gradation is tone control to continuously change the tone between two different colors. The MFP has control patterns called smooth 1 and smooth 2. A gradation designation window will be described later with reference to FIG. 11.

The record of operation ID: 558 represents that the gradation was changed to smooth 2.

Operations from operation ID: 1600 to operation ID: 1603 are operations performed by a user of user ID: 2000.

The record of operation ID: 1602 represents that a job of job ID: 500 was deleted. As an example of use case, a job is set upon receiving an order and deleted when customer's payment is completed.

FIG. 7 shows an example of the above-described login window. The UI 700 is a login dialogue displayed on the operation panel. The user ID text box 701 is used to input a user ID. The password text box 702 is used to input a password. A user performs a login operation on this window. The user inputs a user ID and password and presses the ID key 307. When the ID key 307 is pressed, the MFP 100 performs login authentication processing using the user ID and password input at that point of time. If the user ID and password are correct, the window transits to the operation window shown in FIG. 4.

FIG. 8 illustrates an example of the above-described job selection window. When the user presses the box button 403, the MFP 100 displays this window. A list 801 of documents in box has a function of displaying information such as the type, name, paper size, number of pages, and recording date/time of each document. The type column indicates the color of each stored document. When displaying, for example, icons, a monochrome icon indicates a monochrome document, whereas a color icon indicates a color document. The paper size column indicates a paper size. The page column indicates the number of pages. The date/time column indicates the recording date/time of each document.

When the user presses a print button 802, the printer 107 prints the selected document in the list 801 of documents in box. Only test-print can also be performed by pressing the print button 802. In test-print, only one copy is printed even when a plurality of copies are designated for a job. The user designates an original read button 803 to read original data from the scanner 106. When the user presses a color adjustment button 804, the color adjustment window to be described later with reference to FIG. 9 is displayed. An edit menu 805 allows designating other settings of editing processing associated with document data such as the printing position adjustment window to be described later with reference to FIG. 10.

FIG. 9 shows an example of the above-described color adjustment window. A button 901 is used to increase the value of the concentration of yellow, and a button 902 is used to decrease it. An area 903 displays the designated concentration value. The same items as the buttons 901 and 902 and the area 903 are prepared for magenta, cyan, and black as well to change the settings, although they have no reference numerals. When the user presses a button 904, the window transits to a hue adjustment window to be described later with reference to FIG. 15. When the user presses a button 905, the window transits to a gradation designation window to be described later with reference to FIG. 11. An OK button 906 is used to store the designated values and change the settings. A setting cancel button 907 is used to return the window to the previous window without storing the designated values.

Figure 10:
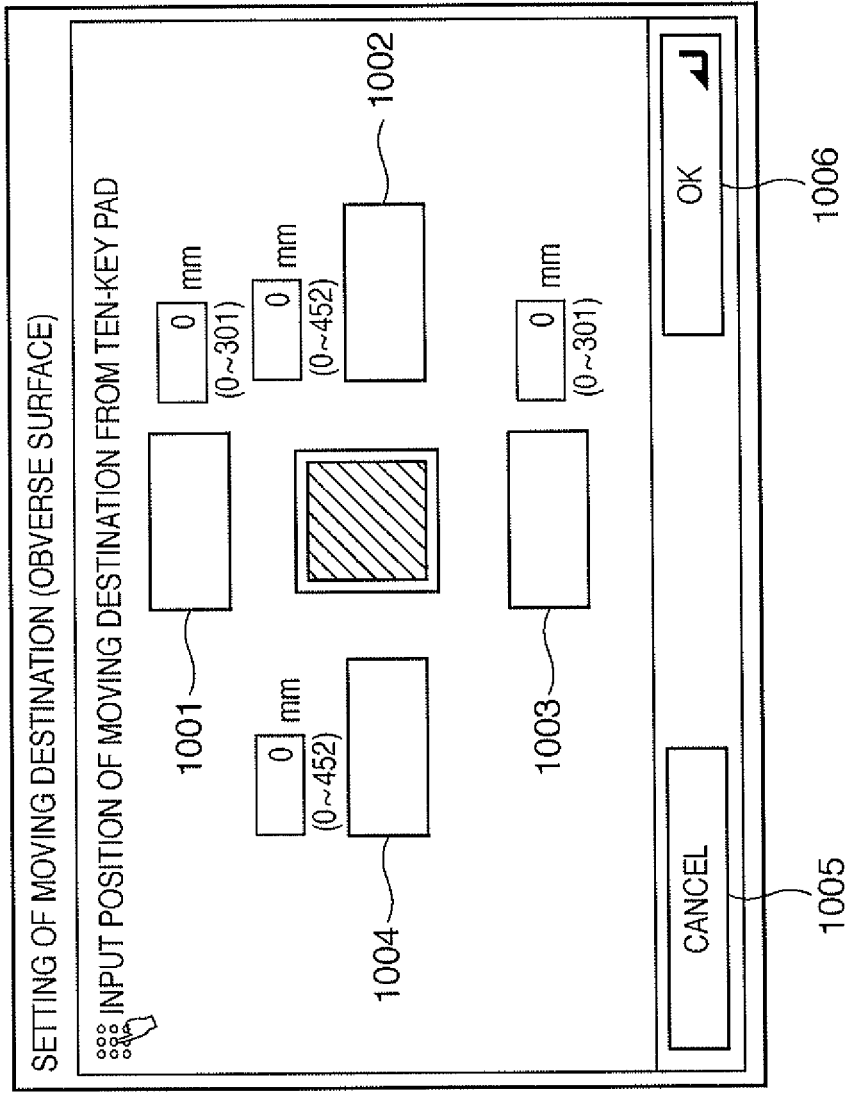
FIG. 10 is a schematic view showing an example of a printing position adjustment window.

FIG. 10 illustrates an example of the above-described printing position adjustment window. Buttons 1001, 1002, 1003, and 1004 are used to designate print directions to move and designate the upper, right, lower, and left directions, respectively. The user selects one of the directions and presses the number keys 306 to designate the moving amount in mm. An OK button 1006 is used to store the designated values. A cancel button 1005 is used to return the window to the previous window without storing the designated values. In the operation history, a direction designation is retained on a plane defined by X- and Y-axes, and stored while setting the right direction as the X positive direction and the upper direction as the Y positive direction.

Figure 11:
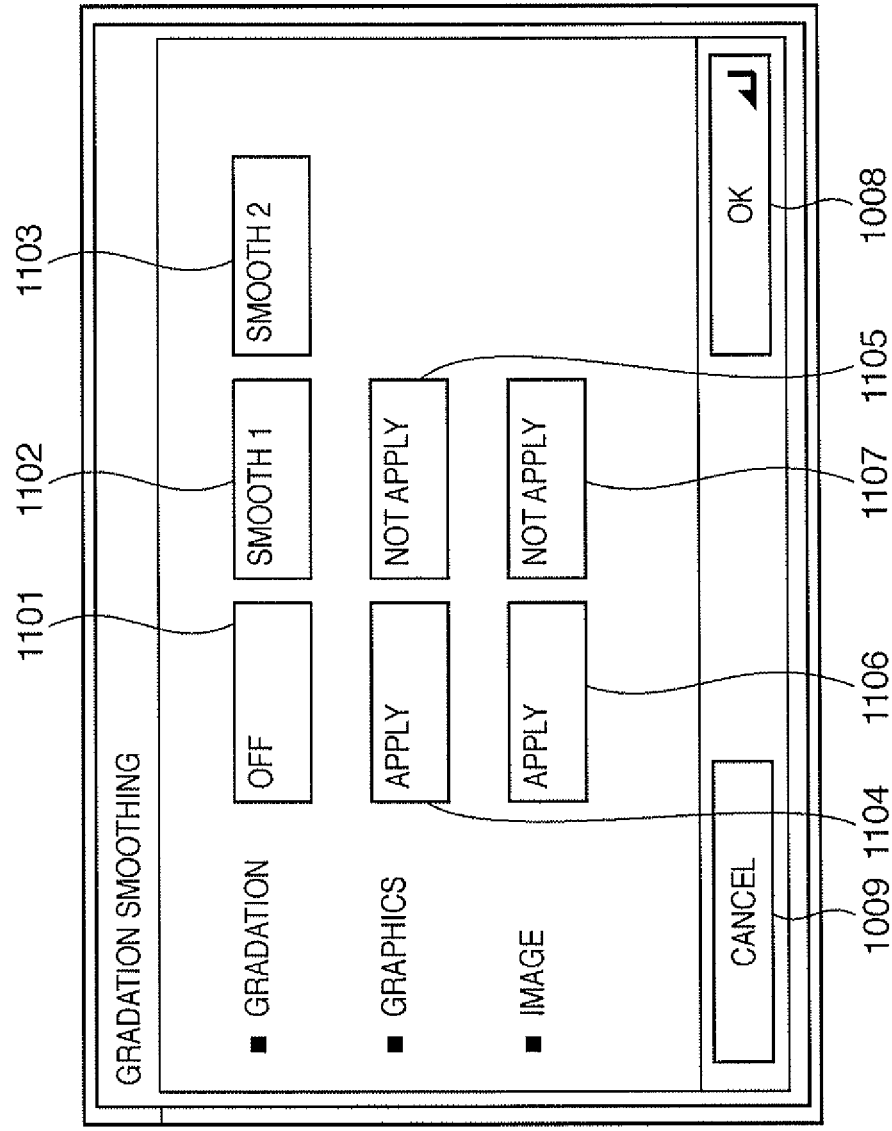
FIG. 11 is a schematic view showing an example of a gradation window.

FIG. 11 shows an example of the above-described gradation designation window. A button 1101 designates gradation off. A button 1102 is used to designate gradation: smooth 1. A button 1103 is used to designate gradation: smooth 2. A button 1104 is used to designate applying gradation to graphics data. A button 1105 is used to designate not to apply gradation. A button 1106 is used to designate applying gradation to image data. A button 1107 is used to designate not to apply gradation. An OK button 1008 is used to store the designated values. A cancel button 1109 is used to return the window to the previous window without storing the designated values.

FIG. 12 shows an example of the above-described job history. The job history records pieces of information such as an operation ID when print processing was instructed, a job history recording number which uniquely specifies a job history, a job ID, job start and end times, a job type, a status representing the job completion state, a user ID which specifies a user, and document attributes including a document name, the number of logic surfaces, a paper size, the number of discharged sheets, the number of printed surfaces, a page layout, a color mode, and a printed surface.

<About Feedback Generation According to Embodiment of Present Invention>

In the present invention, feedback is processing of presenting, to the user, feedback data generated based on the operation history so as to effectively use the operation history from the next time by the user. The operation of the feedback generation unit 509 according to this embodiment will be described with reference to the flowchart in FIG. 13. The feedback processing of the feedback generation unit 509 can start at various timings. For example, the feedback processing is performed when no operation has been done for a job retained in the print queue 508 for a predetermined time or when a job is deleted from the print queue 508.

In step S1301, the feedback generation unit 509 acquires the ID of a target job. For example, if job deletion processing triggers feedback processing, a job to be deleted is the target job. In step S302, an empty list is created to store a set of operations to be fed back. In step S1303, the feedback generation unit 509 reads out, from the operation history, a user operation associated with the target job in step S1301. The operation history is recorded in the HD unit 104.

In step S1304, the feedback generation unit 509 determines whether all user operations have been read out. If YES in step S1304, the process advances to step S1311. Otherwise, the process advances to step S1305. In step S1305, the feedback generation unit 509 determines whether it is an operation during printing. If YES in step S1305, the process returns to step S1303. Otherwise, the process advances to step S1306. The operation during printing is generally test-print and excluded from the feedback target. This selection by determination may be omitted depending on user settings. In step S1306, the feedback generation unit 509 determines whether the operation should be fed back. If YES in step S1306, the process advances to step S1307. Otherwise, the process returns to step S1303. To do this determination, a list of processes to be fed back is prepared in advance. The determination is done based on whether the operation is included in the list.

Figures 14, 15, 16:
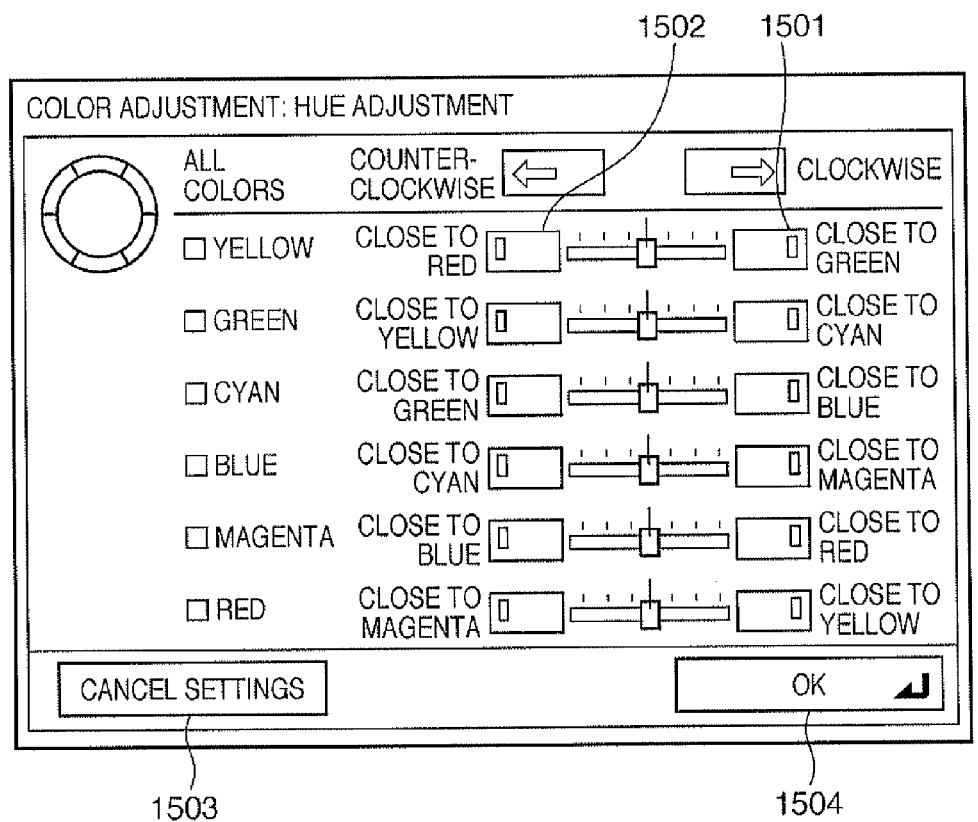
FIG. 14 is a view showing an example of a list of processes not to be fed back.
FIG. 15 is a schematic view showing an example of a hue adjustment window.
FIG. 16 is a view showing an example of a list of aggregatable processes.

FIG. 14 illustrates an example of the list. Hue adjustment processing in FIG. 14 is a process of changing the hue, that is, the properties of colors. For example, depending on the printing apparatus or quality required by the customer, it may unconditionally be determined that adjustment is necessary. In this case, the process is included in the list in advance as definition information and excluded from the feedback target, thereby performing selection. A hue adjustment processing window will be described later with reference to FIG. 15.

In step S1307, it is determined whether the same process as that process has already been registered in the list. If YES in step S1307, the process advances to step S1308. If NO in step S1307, the process advances to step S1310. If the same process as the readout operation has already been added to the list, it is determined in step S1308 whether they are aggregatable.

As an example of the aggregatable process, color adjustment will be explained. An example of the UI is shown in FIG. 9 described above. The color of each of yellow, magenta, cyan, and black can be designated as a numerical value. Pressing the button 901 increases the concentration of the color in a printed product, and pressing the button 902 decreases it. If the printed product has no desired color balance, the user can adjust the concentration of any one of the colors on the UI, print it, and confirm the output. Even if this process has been executed a plurality of number of times as user operations, those processes can eventually be aggregated to one process. For example, in the operation history shown in FIG. 6, a setting to be validated eventually is the setting of operation ID 130 (yellow +3, magenta −2) that is the final process for the colors.

Whether the target process is aggregatable is determined by retaining a list of aggregatable processes in advance and checking whether the target process is included in the list. FIG. 16 shows an example of the list of aggregatable processes. This list includes color balance as an aggregatable process.

Figures 17, 18:
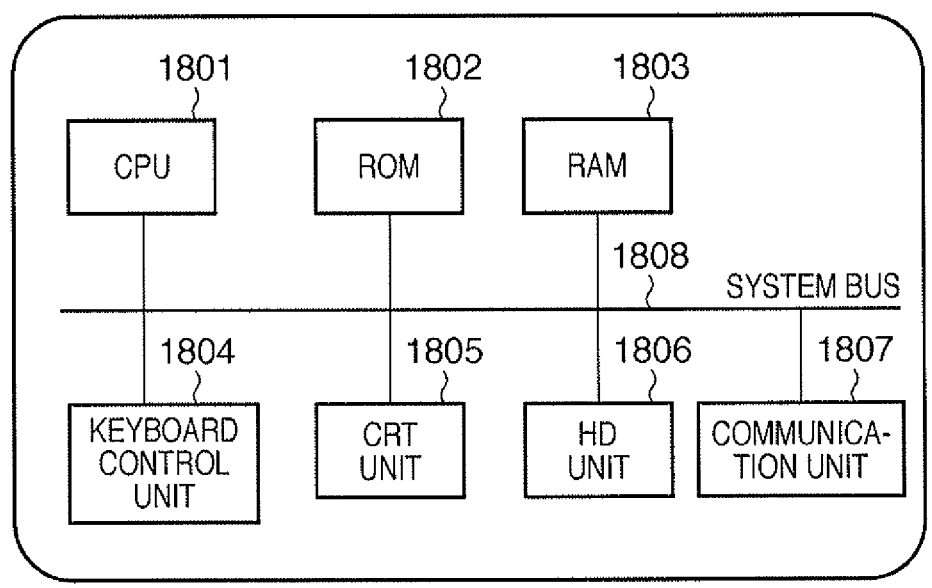
FIG. 17 is a view showing an example of conversion to JDF.
FIG. 18 is a block diagram showing an example of a computer.

In step S1309, the aggregatable process is added to the list. In this case, the aggregatable process is overwritten on the same process in the existing elements of the list. In step S1310, the process is added to the list. In step S1311, processes to be fed back, which are accumulated in the list, are converted into JDF. FIG. 17 shows an example in which the color adjustment setting (yellow +3, magenta −2) corresponding to operation ID 130 in FIG. 6 is converted into JDF. In step S1312, to return the data to the job transmission source, the process type, process date/time, and converted JDF data associated with the job ID are transmitted to the job manager 502.

The converted JDF data is returned to the management apparatus. To distinguish between this JDF data and JDF that is print setting data created by the management apparatus and transmitted to the MFP, the JDF converted in step S1311 will be referred to as setting definition data.

FIG. 15 illustrates an example of a dialogue window to perform the above-described hue adjustment processing. The MFP 100 can adjust the hue of each color when generating the yellow, green, cyan, blue, magenta, and red colors. For example, yellow can be designated to be close to green by a button 1501 or close to red by a button 1502. The same hue designation as that for yellow can be done for green, cyan, blue, magenta, and red as well, although no reference numerals are added. An OK button 1504 is used to store the designated information. A settings cancel button 1503 is used to close the dialogue window without storing the designated information.

The process lists shown in FIGS. 14 and 16, which are used for the above-described determinations, include appropriate initial values set at the time of manufacturing. A user or a service person can update the values later. Only one or both of the two pieces of definition information can be used as needed.

<Cooperation of MFP and PJM>

FIG. 18 shows an example of the arrangement of a computer applicable in the embodiment of the present invention. This is an example of a block diagram of a computer on which the prepress manager 501, the job manager 502, the history management server 506, the authentication server 507, the job connector 510, and the external controller 511 run.

A CPU (Central Processing Unit) 1801 controls the entire computer and performs arithmetic processing and the like. A ROM (Read Only Memory) 1802 is a storage area for, for example, the information of a system activation program. A RAM (Random Access Memory) 1803 is a data storage area without use limits. The RAM 1803 is an area to load and execute the operating system, applications, device drivers, and programs for, for example, communication control. A KBC (keyboard controller) 1804 receives input data from a keyboard and transmits it to the CPU. A CRT unit (display controller) 1805 controls display on a display unit.

An HD unit 1806 is an external storage device such as an HD (hard disk), an FD (Floppy® disk), or an SRAM (nonvolatile storage device). The HD unit 1806 stores programs and data and refers to them or loads them in the RAM 1803 as needed at the time of execution. A communication unit 1807 controls network communications. The communication unit 1807 can communicate with another computer or peripheral device connected to a network, as described with reference to FIG. 1. A system bus 1808 serves as a path for data transmission/reception between the above-described constituent elements. In this embodiment, the computer has the function of a management apparatus which manages job data for print processing. The computer will be referred to as a PJM (Print Job Manager) hereinafter.

Figure 19A:
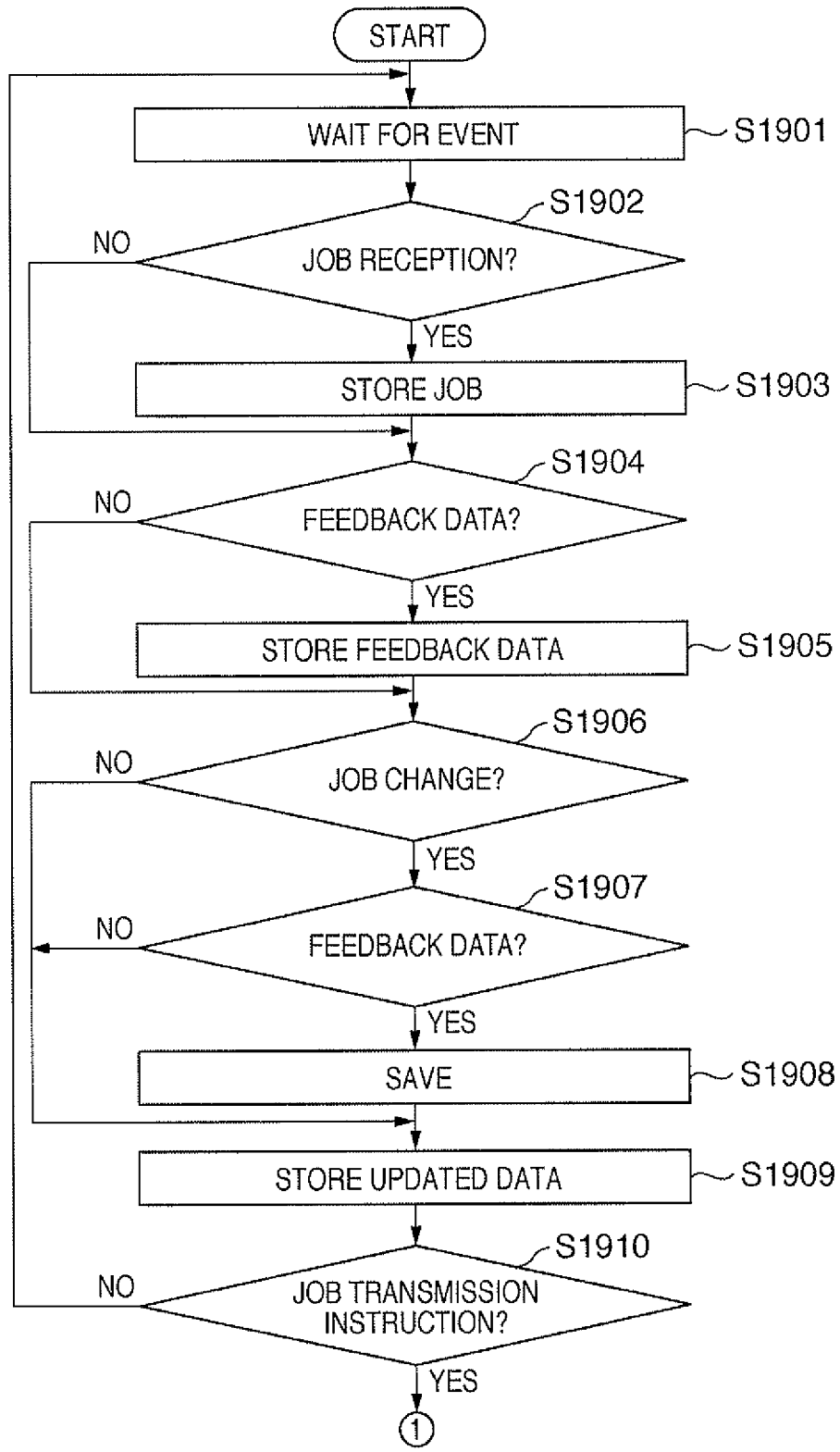
FIG. 19A is a flowchart illustrating job transmission processing in PJM.
Figure 19B:
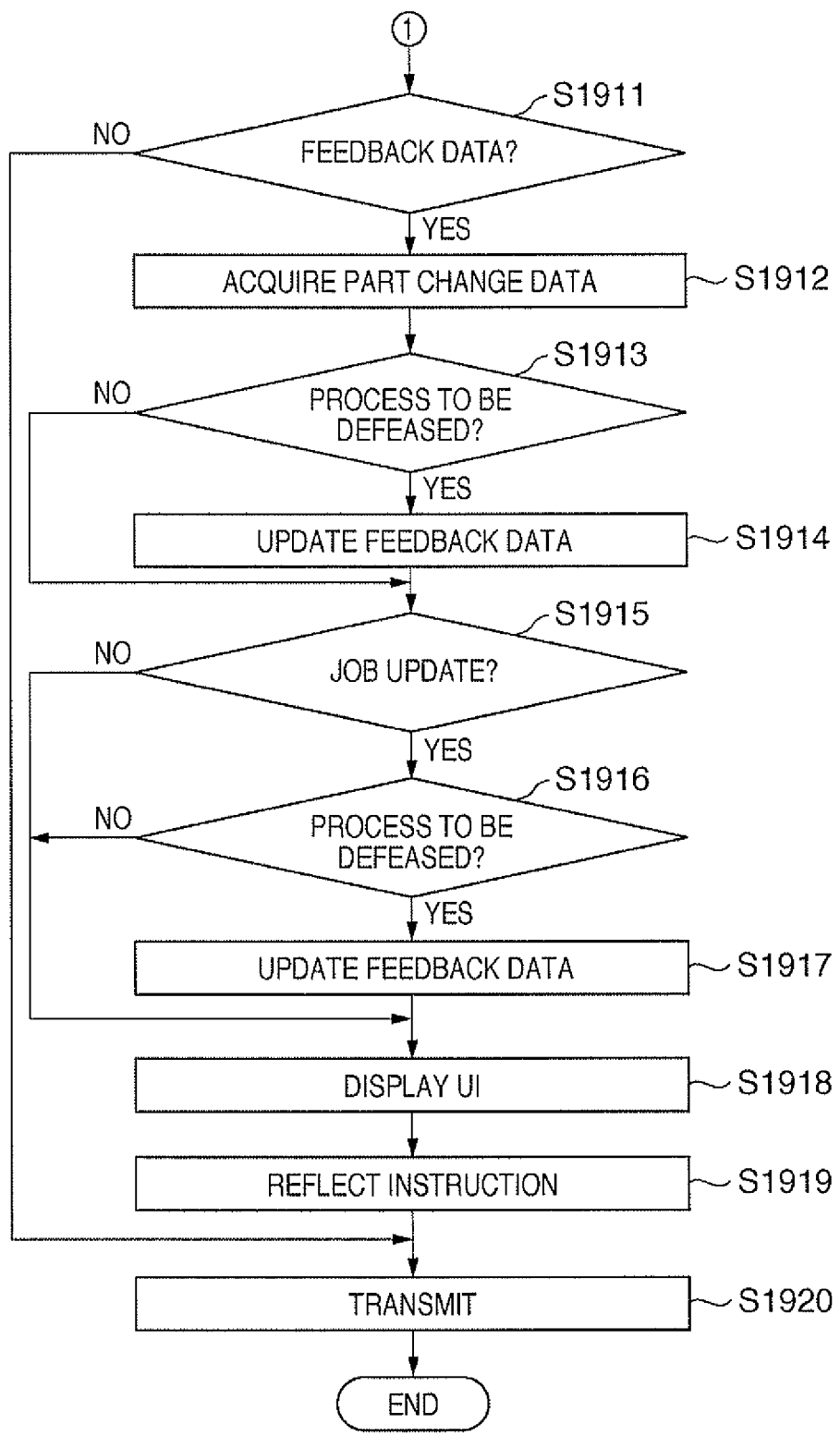
FIG. 19B is a flowchart illustrating job transmission processing in PJM.

The operation of the PJM according to the embodiment of the present invention will be explained with reference to the flowchart in FIGS. 19A and 19B. This operation is assumed to be performed by the above-described computer. In step S1901, the PJM waits for a process event to be performed by the MFP. The event indicates, for example, an instruction from another program or a user. If some event has occurred, the process advances to step S1902.

In step S1902, the PJM determines whether the event received in step S1901 is job reception from the prepress manager 501. If YES in step S1902, a folder is created in the HD unit 1806 to store the job in step S1903. A JDF file, a PDF file, or the like is stored as the job.

In step S1904, the PJM determines whether the event received in step S1901 is feedback data from the MFP 100. If YES in step S1904, the feedback data is stored in step S1905 in a folder that stores the original JDF file. The feedback data is a list of one or more user operations and will therefore be referred to as a feedback list here.

In step S1906, the PJM determines whether the event received in step S1901 is an update instruction for a stored job from the user. If YES in step S1906, the process advances to step S1907. Otherwise, the process advances to step S1909.

In step S1907, the PJM determines whether feedback data associated with a JDF file corresponding to the update target job exists. If YES in step S1907, the JDF file is saved in step S1908. In step S1909, a JDF file which has reflected the job update instruction from the user is stored. The job update is, for example, changing the paper size or paper type.

In step S1910, the PJM determines whether the event received in step S1901 is a job transmission instruction from the user. If YES in step S1910, the process advances to step S1911. Otherwise, the process returns to step S1901.

In step S1911, the PJM determines whether feedback data associated with a JDF file corresponding to the transmission target job exists. If YES in step S1911, the process advances to step S1912. Otherwise, the process advances to step S1920.

In step S1912, the PJM acquires a part change history from the MFP 100.

FIG. 20 shows an example of the part change history. The part change history includes the information of part names and change dates.

In step S1913, the PJM collates the feedback data with the part change history and determines whether feedback data to be defeased exists. This determination is done by referring to the feedback data and a change part collation table (FIG. 21) of change parts obtained from the part change history.

FIG. 21 illustrates an example of the change part collation table. This table has definition information representing the correspondence between a change part and a corresponding process (setting item) to be defeased. Invalidation indicates deleting target setting information from feedback data generated based on a past operation history.

For example, if the part change history includes change of the yellow toner, the PJM refers to the change part collation table in FIG. 21 and determines to defease color adjustment processing of yellow. If a target part has been changed after an operation included in the feedback data, reproducing the operation is regarded to be meaningless at high probability. Hence, the above-described determination is done aiming at defeasing data corresponding to the operation included in the feedback data.

In step S1914, the PJM deletes, from the feedback list, a user operation corresponding to the process determined to be defeased.

In step S1915, the PJM determines whether a job update instruction is received. As for the presence/absence of a job update instruction, for example, the presence/absence of data saved in step S1908 is confirmed and determined. In step S1916, the PJM determines whether a process to be defeased in correspondence with the job data update exists. This determination is done by referring to a table representing the correspondence between an updated process and an operation process (FIG. 22).

FIG. 22 shows an example of a definition information table representing the correspondence of processes to be defeased in feedback data based on job update. This example indicates that when the paper size has been changed, printing position adjustment processing is regarded as a process to be defeased.

In step S1917, the PJM updates the feedback list in consideration of the defeased process based on the determination in step S1916.

In step S1918, contents to be fed back based on the updated feedback list are displayed on a dialogue window. FIG. 23 illustrates an example of the dialogue window. Details of FIG. 23 will be explained later.

In step S1919, the PJM further updates the feedback list based on a user instruction and reflects it on the JDF file. In step S1920, the PJM transmits, to the MFP 100, the transmission target job after reflecting the instruction.

FIG. 23 shows an example of a dialogue window displayed for the user when the job manager 502 has received a job transmission instruction to the MFP 100. In this example, user operations in the operation history shown in FIG. 6 are processed and fed back to the user as feedback data. Each operation has a check box that allows the user to select application on or off.

An item 2301 is a check box which designates whether to reflect color balance processing performed via the operation panel on the JDF. An item 2302 is a check box which designates whether to reflect printing position adjustment processing performed via the operation panel on the JDF. An individual designate button 2303 enables to further divide the processing displayed on the left side of the button and change individual print settings. For example, a dialogue is displayed in which the instruction of the item 2302 is divided into two items, that is, printing position adjustment X: +3 and printing position adjustment Y: +3, and a check box is added to each item to designate the individual items.

The above-described communication between the prepress manager 501, the job manager 502, and the MFP 100 can be implemented using a protocol such as TCP/IP or any other arbitrary protocol that enables information exchange on the network.

The PJM thus presents, to the user, feedback data generated based on a past operation history. This decreases the number of man-hour concerning user operations and largely shortens the time from job input to completion of printing. In addition, settings are effectively aggregated on the MFP side. Since the user need not perform an operation of selecting unnecessary print settings, the operation efficiency improves, and human errors can be eliminated. When the PJM and the MFP cooperate as a print processing system, the operation history of a job managed on the MFP side disappears. However, aggregating and updating the operation history makes it possible to continually retain settings effective for subsequent processing.

[Second Embodiment of Present Invention]

Figure 13:
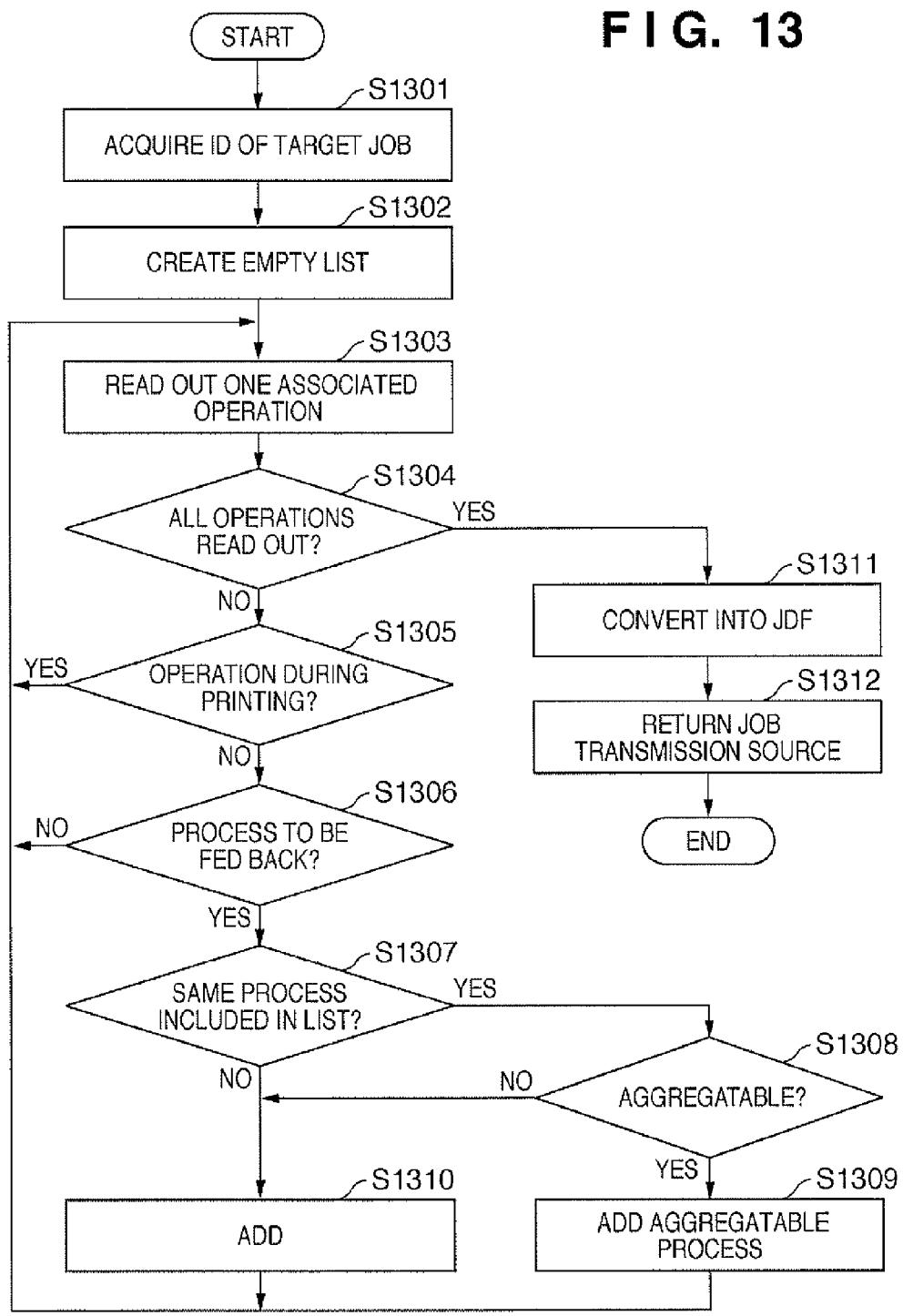
FIG. 13 is a flowchart illustrating processing of creating feedback data in the MFP.

In the first embodiment, the feedback generation unit 509 analyzes the operation history using, as a trigger, a timing predetermined in the MFP 100, as defined in step S1301 of FIG. 13. Instead, a history management server 506 provided outside an MFP 100 may periodically acquire the operation history from a history storage unit 505 and transmit it to a job manager 502. This is effective when the MFP 100 can record a less operation history or the operation load of the MFP 100 should be reduced. The history management server 506 runs on an independent computer. Hence, this embodiment can be applied at permanently accumulating history information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287180, filed Nov. 7, 2008, which is hereby incorporated by reference herein in its entirety.

What is claimed is:

1. A print processing apparatus connected to a management apparatus for managing job data, comprising at least one processor functioning as at least one of:

a retention unit configured to retain print data corresponding to the job data received from the management apparatus;

an operation reception unit configured to receive a print setting change operation by a user using an operation unit of the print processing apparatus for the print data retained by the retention unit;

an operation history storage unit configured to store an operation history of change operations received by the operation reception unit;

a generation unit configured to generate, according to definition information, feedback data to be fed back to print settings of the job data based on at least some of print setting items included in the operation history stored in the operation history storage unit;

a transmission unit configured to transmit, to the management apparatus, the feedback data generated by the generation unit so that the job data managed by the management apparatus reflects contents of the generated feedback data; and a print unit configured to print the print data retained by the retention unit, wherein the definition information includes a designation of a print setting item not to be fed back, and wherein the generation unit is configured to determine, in a case where a plurality of operation histories stored in the operation history storage unit have the same process, whether the plurality of operation histories are aggregatable when the feedback data is generated.

2. The apparatus according to claim 1, wherein the definition information is designated by the user.

3. The apparatus according to claim 1, wherein the generation unit is configured to generate the feedback data without an operation history corresponding to a change operation performed in test-print of the print data.

4. A non-transitory computer-readable storage medium storing a program which causes a computer to function as units of a print processing apparatus of claim 1.

5. A method of controlling a print processing apparatus connected to a management apparatus for managing job data, comprising: a retention step of retaining print data corresponding to the job data received from the management apparatus;

an operation reception step of receiving a print setting change operation by a user using an operation unit of the print processing apparatus for the print data retained in the retention step;

an operation history storage step of storing an operation history of change operations received in the operation reception step;

a generation step of generating, according to definition information, feedback data to be fed back to print settings of the job data based on at least some of print setting items included in the operation history stored in the operation history storage step;

a transmission step of transmitting, to the management apparatus, the feedback data generated in the generation step so that the job data managed by the management apparatus reflects contents of the generated feedback data; and a print step of printing the print data retained in the retention step, wherein the definition information includes a designation of a print setting item not to be fed back, and wherein in the generation step, in a case where a plurality of operation histories stored in the operation history storage step have the same process, it is determined whether the plurality of operation histories are aggregatable when the feedback data is generated.

6. The method according to claim 5, wherein in the generation step, the feedback data is generated without an operation history corresponding to a change operation performed in test-print of the print data.

* * * * *